(12) United States Patent
Bou-Zeid et al.

(10) Patent No.: US 11,573,353 B2
(45) Date of Patent: Feb. 7, 2023

(54) SYSTEM AND METHOD FOR PERFORMING WIND FORECASTING

(71) Applicant: Trustees of Princeton University, Princeton, NJ (US)

(72) Inventors: Elie Bou-Zeid, Princeton, NJ (US); Mostafa Momen, Princeton, NJ (US); Ken Hu, Newark, DE (US); Danil Kerimi, Maple Ridge (CA)

(73) Assignee: TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 17/095,213

(22) Filed: Nov. 11, 2020

(65) Prior Publication Data

US 2021/0088692 A1    Mar. 25, 2021

Related U.S. Application Data

(63) Continuation-in-part of application No. 15/557,610, filed as application No. PCT/US2016/024508 on Mar. 28, 2016, now Pat. No. 10,879,702.

(60) Provisional application No. 62/139,083, filed on Mar. 27, 2015.

(51) Int. Cl.
*G01W 1/10* (2006.01)
*H02J 3/38* (2006.01)
*H02J 3/00* (2006.01)

(52) U.S. Cl.
CPC ............... *G01W 1/10* (2013.01); *H02J 3/004* (2020.01); *H02J 3/381* (2013.01); *H02J 2203/20* (2020.01); *H02J 2300/28* (2020.01)

(58) Field of Classification Search
CPC .. G01W 1/10; H02J 3/004; H02J 3/381; H02J 2300/28; H02J 2203/20
See application file for complete search history.

(56) References Cited

U.S. PATENT DOCUMENTS

| | | | | |
|---|---|---|---|---|
| 5,372,039 | A * | 12/1994 | Wiese | G01P 3/62 702/3 |
| 8,200,435 | B2 * | 6/2012 | Stiesdal | G01W 1/10 702/3 |
| 8,606,418 | B1 | 12/2013 | Myers | |
| 8,606,481 | B2 * | 12/2013 | Yamaguchi | F02N 11/0814 701/99 |

(Continued)

OTHER PUBLICATIONS

Chinese Office Action dated Jul. 3, 2019, in Chinese Application No. 201680026427.6, including English language translation.

(Continued)

*Primary Examiner* — Raymond L Nimox
(74) *Attorney, Agent, or Firm* — FisherBroyles, LLP

(57) ABSTRACT

A system and method for performing novel wind forecasting that is particularly accurate for forecasting over short-term time periods, e.g., over the next 1-5 hours. Such wind forecasting is particularly advantageous in wind energy applications. The disclosed method is anchored in a robust physical model of the wind variability in the atmospheric boundary layer (ABL). The disclosed method approach leverages a physical framework based on the unsteady dynamics of earth's atmosphere, and drives forecasting as a function of previously-observed atmospheric condition data observed at the same location for which a wind forecast is desired.

23 Claims, 6 Drawing Sheets

(56) References Cited

U.S. PATENT DOCUMENTS

| | | | | |
|---|---|---|---|---|
| 2010/0180694 A1* | 7/2010 | Ely, III | .................. | G01W 1/10 73/861.42 |
| 2012/0185414 A1* | 7/2012 | Pyle | ....................... | G01W 1/10 706/11 |
| 2012/0303278 A1* | 11/2012 | Dannevik | ............... | G01W 1/00 702/3 |
| 2013/0046492 A1* | 2/2013 | Westergaard | ........... | H02J 3/386 702/60 |
| 2014/0195159 A1* | 7/2014 | Mewes | ................. | G01R 21/00 702/3 |
| 2014/0244188 A1* | 8/2014 | Bai | ........................ | F03D 17/00 702/60 |
| 2014/0324351 A1* | 10/2014 | Dannevik | ............... | G01W 1/00 702/3 |
| 2015/0042479 A1* | 2/2015 | Muetzel | ................. | G01W 1/10 340/601 |

OTHER PUBLICATIONS

Elie Bou-Zeid, "Large-Eddy Simulations and Damped-Oscillator Modeling of Unstead Ekman Boundary Layers," Released Nov. 20, 2014, Retried from the Internet: <http://video.ucar.edu/mms/mmm/2014/e_bou-zeid.mp4>. entire video.

International Search Report dated Jun. 24, 2016 for International Application No. PCT/US2016/024508.

Written Opinion of the International Searching Authority dated Jun. 24, 2016 for International Application No. PCT/US2016/024508.

* cited by examiner

SYSTEM AND METHOD FOR PERFORMING WIND FORECASTING

CROSS-REFERENCE TO RELATED APPLICATION

This application is a continuation-in-part of U.S. application Ser. No. 15/557,610, filed Sep. 12, 2017, which is a U.S. national stage application of International Application No. PCT/US2016/024508, filed Mar. 28, 2016, which claims the benefit of priority under 35 U.S.C. § 119(e) to U.S. Provisional Patent Application No. 62/139,083, filed Mar. 27, 2015, the entire disclosures of each of which are hereby incorporated herein by reference.

STATEMENT OF GOVERNMENT INTEREST

This invention was made with government support under Grant No. AGS-1026636 awarded by the National Science Foundation. The government has certain rights in the invention.

FIELD OF THE INVENTION

The present invention relates generally to the fields of weather forecasting and energy supply management forecasting. More particularly, the present invention provides a system and method for performing wind forecasting that produces short-term wind forecasts with increased ease, and with increased accuracy that may be used to advantage in energy supply management and other commercial applications.

BACKGROUND

Various systems and methods presently exist for weather, and particularly wind, modeling. Such wind modeling can be used in a variety of applications, for a variety of purposes. One exemplary application is use in the context of the energy market, which involves forecasting of a variety of weather conditions, including wind, for the purpose of forecasting energy supply, managing energy demand, and otherwise for performing power grid management. Wind energy is emerging as an abundant, financially competitive, and increasingly adopted source of clean renewable energy. Wind is a fast-growing source of primary energy production in the US, partly due to the competitive cost of wind-generated electricity, even without subsidies, compared to electricity generated from fossil sources or nuclear power plants.

The wind's kinetic energy can be harnessed by turbines to produce rotational mechanical energy that can be easily converted to electricity. Nevertheless, the wind speed rises and falls in time, meaning that the wind farms cannot produce a steady rate of electricity all the time. This creates uncertainties in the output wind power, which can have significant impacts on the energy market, as well as on grid operation. Therefore, forecasting the generated wind power, as well as bracketing the uncertainty associated with each forecast, have become inherent challenges for the management of wind farms. Accurate forecasts and uncertainty estimates are critical to keep the electric supply and demand in proper and favorable balance, and to reduce the costly back-up generation that is constantly running to compensate for unforeseen potential drops in renewable generation (this back-up conventional generation is completely wasted if actual wind energy production does not fall below forecasts, while if actual wind production exceeds forecasts, this additional generated power is also wasted since it would be too late to sell it in energy markets). If wind is to contribute large fractions of worldwide electric production in the future, the costs associated with its time variability and the impact of this variability on the reliability of electric supply will rise significantly if it is not well predicted.

Medium-term (approximately 1 day ahead) and long-term (approximately 2 weeks ahead) forecasts, as well as wind farm siting, are best done using meso-scale models of the atmosphere (numerical weather prediction models). However, these models have inherent shortcomings that limit their accuracy for short-term (e.g., 12 hours or less in advance) forecasts. Backup generation capacity, which takes 30-90 minutes to be ramped up, should therefore be kept on standby to quickly compensate for the departure of the actual wind energy production from forecasts in the hour-ahead. Thus, operators need a reliable short-term (e.g., 2 hours ahead or less) forecast to ramp up generation in time, otherwise drops in wind energy production cannot be compensated; demand exceeds supply; and brownouts or blackouts might ensue. If such accurate short-term forecasts are not available, backup generation must be kept running as a safety measure. As wind power penetration increases, the impact of these variability and uncertainty will increase to eventually limit the overall performance of the power system and/or raise power costs by keeping backup systems running at a higher-than-needed rate. Therefore, accurate short-term forecasts are becoming increasingly critical for the efficiency of the whole electric system.

Despite this pivotal role, both the forecasting of short-term wind variability as well as the implications of this variability on wind integration continue to rely on highly simplistic models, and this field is thus ripe and ready for innovative ideas. A widely used method for short-term forecasting remains the conventional so-called "naïve predictor" or "persistence model," which assumes that the wind speed over the next several hours will be equal to the one observed over the last hour. This provides an inaccurate forecast, as wind speeds change rapidly. Sudden drops (called ramps) in wind speeds cannot be captured by this method and can thus compromise power supply reliability. Other short-term forecasting models boast improvement over the persistence model by as little as 10%, and they typically do not provide information about the forecasted wind direction. This short-term forecasting error not only influences the cost and reliability of the produced power, but also has a significant impact on the maximum achievable wind power penetration above which the reliability of the supply is compromised. Current estimates of this maximum achievable penetration rely on simplistic approaches; however, using real-world forecasts (and forecast errors resulting for example from the use of the persistence model) in an accurate grid model has highlighted the problems that grid operators will face as wind penetration increases. Goals of 30 percent of energy from wind would require substantial investments in fossil backup generation if better forecasts were not available. Short-term (e.g., hour-ahead) forecast errors are thus more critical than longer term ones since they guide the planning of gas turbines: gas turbines can be turned on and integrated into the grid in less than 1 hour and therefore if the hour-ahead forecasts (hypothetically) have no errors then little backup generation is needed. On the other hand, for errors in the hour-ahead forecasts, some gas turbines or other sources need to be kept running to allow for fast real-time adjustment.

Accordingly, in the energy context, wind forecasting is relevant in the context of wind power forecasting, to estimate electrical energy generation from wind-driven electric power generation equipment in wind farms. Wind power output varies as wind speed rises and falls. Hence, predicting the wind variability and uncertainty is a critical component of managing the power systems to keep the electric supply of demand in proper and favorable balance. Such information can be used to manage energy supply such that, for example, expected shortfalls from wind-generated power can be compensated for by firing of fossil-fuel (or otherwise powered) power generation equipment, or conversely, fossil-fuel fired/other power generation equipment can be taken offline in response to expected increases in wind-generated power.

Conventional wind forecasting, particularly in the energy industry, relies primarily upon models that provide useful day-ahead forecasts over the following period of 24 hours or more. More specifically in the context of wind power, wind farm operators typically obtain 24-hour forecasts from the National Weather Service or other sources using computer models. These forecasts however often have errors that reduce the efficiency of the wind farm since they either underestimate or overestimate the generated power, which is particularly problematic for the short-term power generation planning. As user herein, the term "short-term" refers to following periods of less than 24 hours, and more specifically over following periods of the next 12, 11, 10, 9, 8, 7, 6, 5, 4, 3, 2 or 1 hours. Such inaccuracy in the short-term forecast often leads to wasted power or a power shortage, as discussed below.

To alleviate this problem, some wind farm operators use more accurate short-term forecasts for the next 2 hours to plan their short-term operations. These models are typically statistical models or a blend of statistical models with numerical weather prediction data. However, these short-term forecasts still have substantial errors and at best outperform the naïve persistence model very moderately (about 5-20% improvement) due to the absence of any physical anchors in most of these data-driven approaches. This limits the usefulness of such wind forecasts, with respect to the energy industry as well as in other contexts.

What is needed is a system and method for performing wind forecasting with increased accuracy, and in particular for performing wind forecasting with a high-degree of accuracy over short-term future periods.

SUMMARY

The present invention provides a system and method for performing wind forecasting with increased accuracy for short-term future periods that is beneficial to any application for which short-term wind forecasting, e.g., within the next 1-6 hours, is needed, such as in the context of energy supply management. The disclosed method benefits any application for which accurate short-term wind forecasting is desired.

The method provides a historical data-driven, but physically-based, approach. It is based on the extrapolation from recent wind-speed data of the slowly-varying large scale atmospheric pressure force gradients (rather than extrapolation of wind speed directly, as is currently the norm for the short-term forecasting models) into the future, and then determining the future wind speed as a function of those extrapolated pressure force gradients. This approach is advantageous in that it provides particularly accurate short-term wind forecasts in part because wind speeds are highly variable over time, while the large-scale atmospheric pressure forces vary more slowly over time. By accounting for a recent trend, the large-scale atmospheric pressure forces can be extrapolated into a future period to provide an accurate large-scale atmospheric pressure force forecast for the future period. Using the model, a corresponding wind speed forecast can be determined for the future period with increased accuracy over other wind forecasting methods, particularly for a forecast for a short-term future time period.

A primary application is in wind energy. The disclosed method is anchored in a robust physical model of the wind variability in the atmospheric boundary layer (ABL). The disclosed approach, by introducing a physical framework based on the unsteady dynamics of the atmosphere, and driving it with previous observations at the same location (or multiple nearby locations), marks a departure from current practice and offers an improved approach for short-term forecasting.

According to one aspect, the present invention provides a computer-implemented method for performing wind forecasting using a computer-implemented wind forecasting system comprising a microprocessor, a memory operatively coupled to the microprocessor, and microprocessor-executable instructions for causing the wind forecasting system to perform the wind forecasting method. In one exemplary embodiment, the method comprises: storing, at the wind forecasting system, a physical model of time-varying wind flow in earth's atmosphere, the model correlating atmospheric pressure forces to wind speeds over time; receiving, at the wind forecasting system, data reflecting changes over time of wind speeds for a particular geographical region during a preceding period of time, the preceding period of time preceding a reference time; performing, at the wind forecasting system, an inverse application of the model to determine, at the wind forecasting system, a trend reflecting changes over time of large-scale atmospheric pressure forces for the geographical region during the preceding period of time as a function of the changes over time in wind speeds for the geographical region; extrapolating, at the wind forecasting system, the trend to determine forecasted large-scale atmospheric pressure forces for the geographical region during a future period (e.gt., short-term period) of time, the future period of time succeeding the reference time; and performing, at the wind forecasting system, a forward application of the model to determine, at the wind forecasting system, forecasted wind speeds for the geographical region during the future period of time, as a function of the forecasted large-scale atmospheric pressure forces for the future period of time.

BRIEF DESCRIPTION OF THE FIGURES

An understanding of the following description will be facilitated by reference to the attached drawings, in which.

DETAILED DESCRIPTION

The present invention provides a system and method for wind power forecasting that leverages a dynamic wind modeling analysis to provide wind forecasts that provide improved accuracy in short-term wind forecasts. The method provides a historical data-driven, but physically-based, approach. It is based on the extrapolation from recent wind-speed data of the slowly-varying large scale atmospheric pressure force gradients (rather than extrapolation of wind speed directly, as is currently the norm for other available models, including the persistence model) into the future, and then determining the future wind speed as a function of those extrapolated pressure force gradients. The present invention can significantly reduce errors in short-term wind forecasts. This results in significant improvement to conventional short-term wind predictions. Compared to conventional predictions, this model is easier to generalize and more accurate than statistical approaches, and much faster than fully 3D numerical weather prediction models, with significant reductions in the short-term prediction errors compared to existing statistical as well as dynamical approaches.

The model is anchored in a robust physical model of wind variability in the atmospheric boundary layer (ABL). Current short-term forecasting approaches are statistical or data driven, with little physical basis. Our model, by introducing a physical framework based on the unsteady dynamics of the atmosphere, and driving it with previous observations at the same geographical location, departs from prior practice and provides a novel approach for short-term forecasting.

Figure 1:
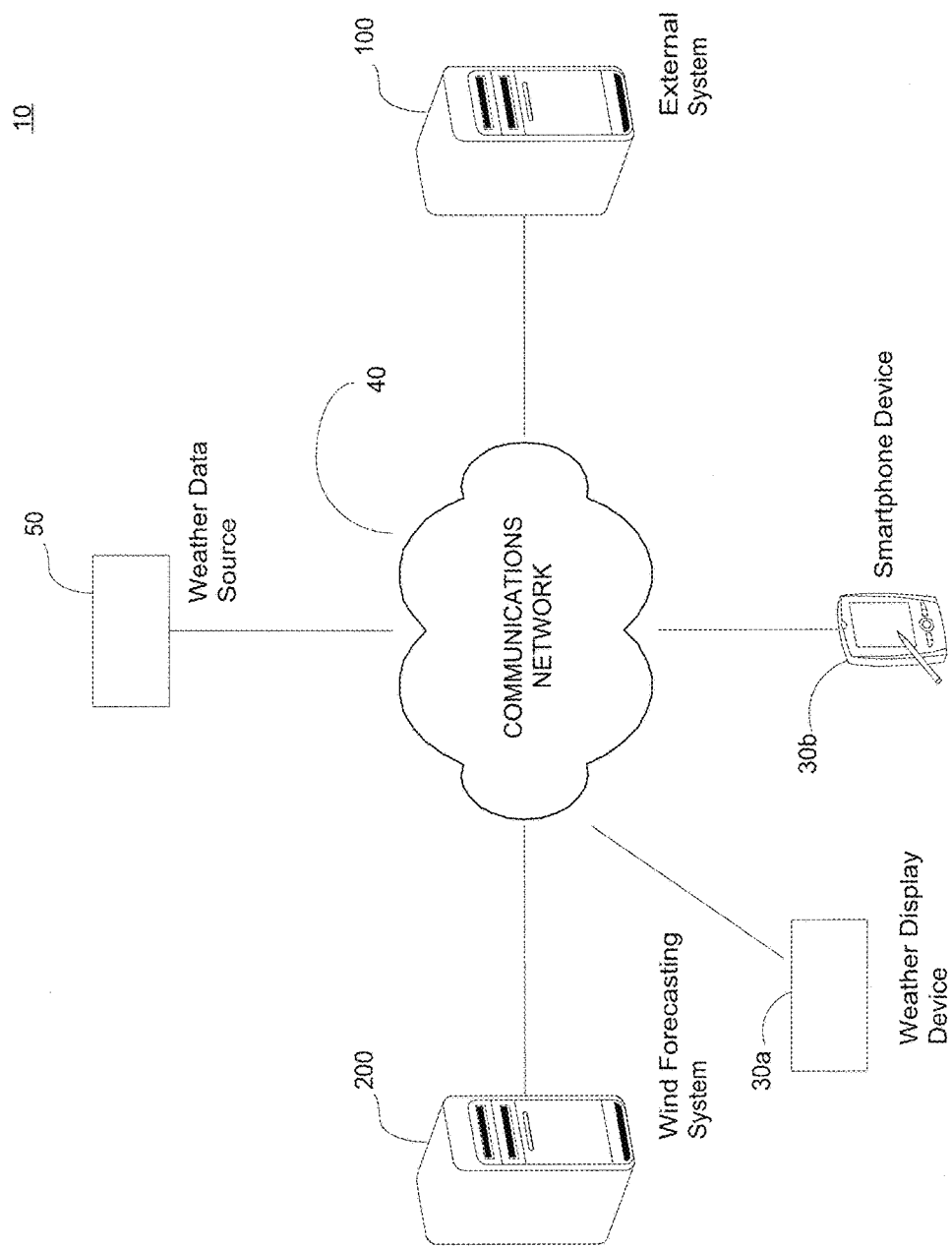
FIG. 1 is a diagram showing an exemplary networked computing environment including a wind forecasting system in accordance with an exemplary embodiment of the present invention.

For illustrative purposes, exemplary embodiments of the present invention are discussed below with reference to FIGS. 1-6. FIG. 1 is a schematic diagram showing an exemplary networked computing environment 10 including a wind forecasting system (WFS) 200 in accordance with an exemplary embodiment of the present invention. In this exemplary embodiment, the WFS 200 is operatively connected to other computing systems via a communications network 40, such as the Internet and/or a Virtual Private Network (VPN) connection. Hardware and software for enabling communication of data via communications networks are well known in the art and beyond the scope of the present invention, and thus are not discussed in detail herein.

Further, the computing environment 10 further includes a weather data source 50 that is operatively connected for communication via the network 40. Accordingly, in this embodiment, the WFS 200 is capable of receiving weather data from the weather data source 50 via the communications network 40. However, in alternative embodiments, the weather data may be communicated to the WFS 200 by other means, e.g., by storing the weather data on tangible computer readable media and physically transporting such media to the WFS 200 where it may be read so that the weather data may be retrieved therefrom. The weather data source may be any proprietary or conventional commercially available data source. By way of example, wind data from national weather system, satellite data, airline reports, wind farm operator's data, or public data such as buoy data from National Oceanic and Atmospheric Administration may be used as the weather data source. Any suitable weather data information may be provided by the weather data source. In particular, and in accordance with the present invention, the weather data source stores and transmits to the WFS 200 weather data including time-dependent wind speed data for one or more particular geographical regions. Such wind speed data may include, for example, data reflecting changes over time of wind speeds, e.g., as a time-dependent horizontal wind velocity vector (e.g., wind speed and direction), for a particular geographical region during a preceding period of time. For example, the wind speed data may consist of one or more time series for the wind speed and direction, acquired every 1 to 10 minutes, during the preceding days, weeks or months.

Although the systems for wind forecasting technology described herein have many applications, such as for wind speed forecasting around airports or in consumer-oriented electrics, of particular interest is the use of the wind forecasting technology described herein in connection with the electrical power field. The use of the novel wind forecasting technology can improve the operational efficiency of wind farms, electricity market clearing, economic load dispatch planning, generation and load increment/decrement decisions, and the regulatory framework for wind energy, therefore reducing the cost of wind energy production. For this reason, it can have a transformative impact on the ability to handle variability and uncertainty of wind. Its incorporation into an energy market model will open new possibilities for optimizing grid integration. More specifically, this novel wind forecasting significantly reduces errors in short-term forecasting and will hence reduce the financial overhead related to backup power generation (when the actual wind is less than forecasted wind) and unused generated wind power (when the actual wind is greater than forecasted wind). This will result in large financial savings for wind operators and the grid as a whole, and increase the capacity factor for wind farms.

It is believed that a 20% penetration of wind requires over 3% of the power generation capacity running purely in reserve. In other words, high wind penetration would require a backup generation of about 15% of the power that wind will produce (and that fraction increases if penetration is above 20%). This needed backup generation is estimated to fall from 20% to 3% of the produced wind energy if one could totally eliminate forecast uncertainties. Alternatively, substantial investments in expensive storage could be used if storage technologies evolve, but this storage need also largely vanishes if short-term forecasting uncertainties can be eliminated.

Figure 2:
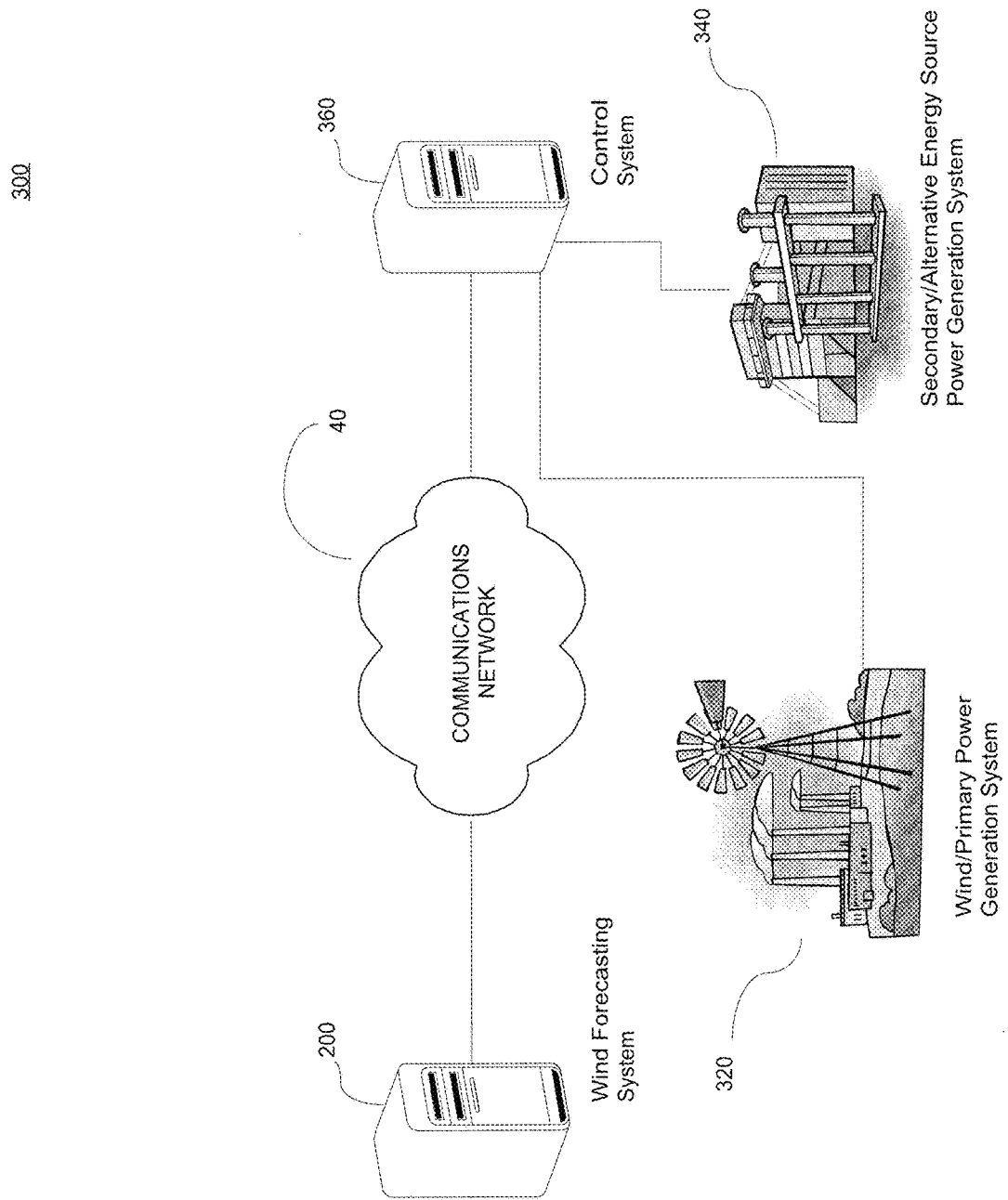
FIG. 2 a schematic showing an exemplary power generation system including a wind forecasting system in accordance with an exemplary embodiment of the present invention.

FIG. 2 is a schematic diagram showing an alternative networked computing environment in the nature of a power generation system 300 for generating electrical power supplied to a power grid. For illustrative simplicity, FIG. 2 shows primary power generation equipment 320 powered by a source of wind. This primary power generation equipment 320 can be that of a conventional electrical power-generating wind farm (even as small as a single turbine), including onshore and offshore wind farms, or even multiple farms and wind energy producing devices that are interconnected over a region and operated or managed together to supply energy to an interconnected grid, as long as a short term forecast is used to optimize the functioning of the wind energy generating devices. Such equipment is well known in the art and beyond the scope of the present invention, and thus is not discussed in greater detail herein. The primary power generation equipment may be physically disposed in a particular geographical region, for example, within a particular town, country, etc., or may be part of an interconnected grid covering large, less-well-defined areas, such as the eastern United States.

Further, FIG. 2 shows secondary power generation equipment 340 powered by an energy source other than wind. This secondary power generation equipment 340 can be that of a conventional, fossil fuel-powered, nuclear-powered, hydroelectric, or other electrical power generation facility, the production of which can be ramped up or down to compensate for fluctuations in the produced wind energy, and which is therefore controlled jointly with the wind energy producing turbines or farms. Such equipment is well known in the art and beyond the scope of the present invention, and thus is not discussed in greater detail herein.

As is well-known in the field of electrical power generation, the operation and power output for such power generation systems is regulated and/or controlled to produced desired amounts of electrical power to meet grid/other power demands by a control system 360. Conventional control systems are well known in the art and beyond the scope of the present invention, and thus are not discussed in greater detail herein.

In accordance with the present invention, the electrical power generation system 300 further includes a wind forecasting system 200, which is shown in the exemplary system of FIG. 2 for illustrative clarity as a system separate and distinct from the control system 360. As described herein, the wind forecasting system 200 performs and communicates wind forecasts, including wind speed forecasts that are particularly accurate in the short-term. In accordance with this exemplary embodiment of the present invention, those forecasts are provided to the control system 360. The control system 360 uses such forecasts to control operation of the primary and second power generation systems 320, 340 in an otherwise conventional matter. In other embodiments, the essential functionality of the WFS 200 may be incorporated into the control system 360 to provide a novel control system 360. In either case, the control system 360 receives forecasted wind speeds for the geographical region of interest (e.g., corresponding to a geographical location of a single turbine, a single wind farm, multiple wind farms, an airport, etc.) during the future period of time, the control system responsively transmits a control signal to the secondary power generation equipment to throttle (by increasing or decreasing, as appropriate) electrical power production from the secondary power generation equipment as a function of the expected output from the primary power generation equipment, which is a function of the forecasted wind speeds. This transmitted control signal does not have to be a fully-automated or electronic signal, and could consist of a human-produced message if the control system is built such as to include a certain level of human control over the operation.

Figure 3:
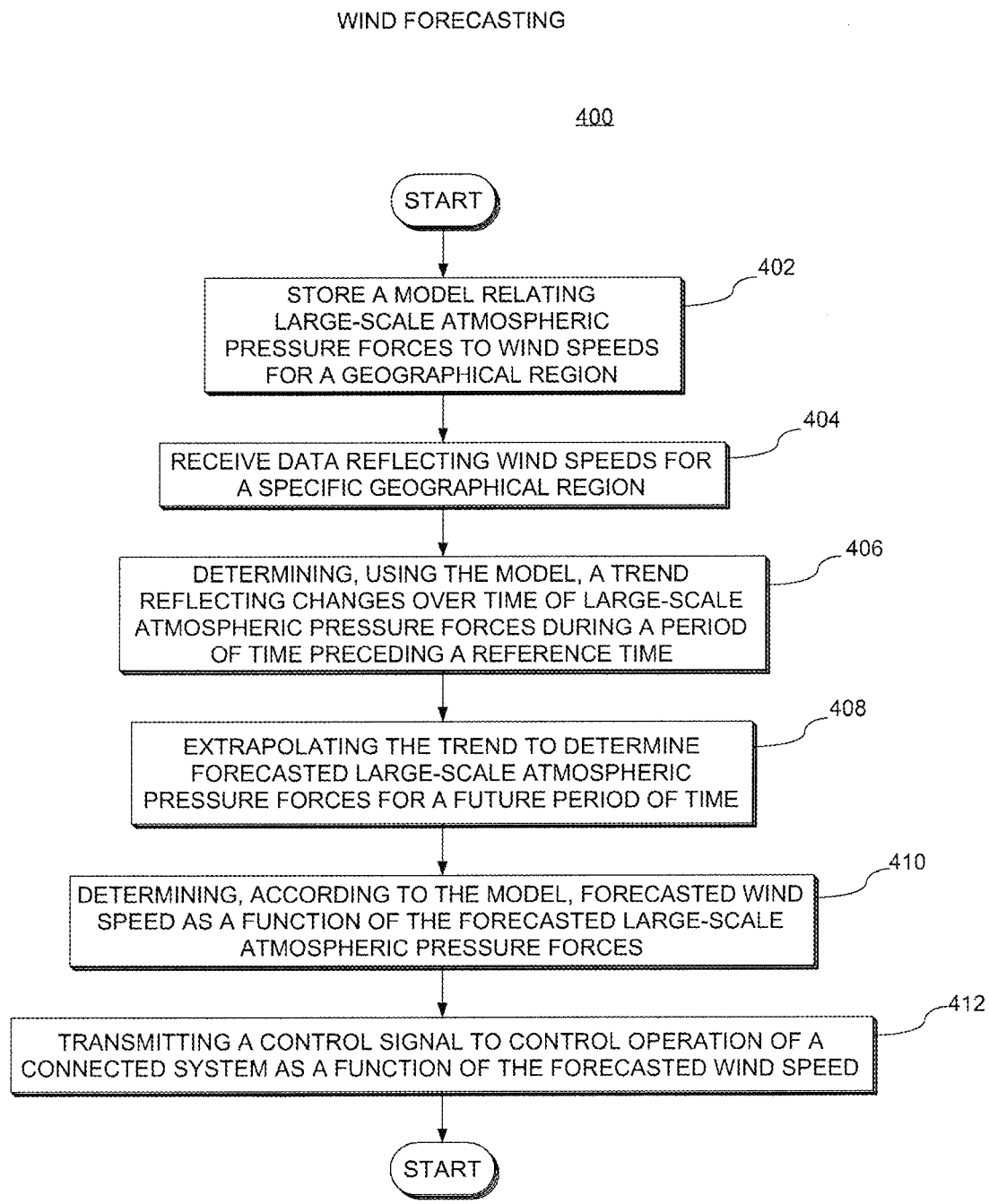
FIG. 3 is a flow diagram illustrating an exemplary method for performing wind forecasting in accordance with an exemplary embodiment of the present invention.

Referring now to FIG. 3, a flow diagram 400 is shown that illustrates an exemplary method for performing wind forecasting in accordance with an exemplary embodiment of the present invention. In this exemplary embodiment, wind forecasting is performed by a WFS 200, which includes a processor, a memory operably connected to the processor for storing instructions, and instructions stored in the memory for causing the system to carry out the wind forecasting method, as discussed in greater detail below with reference to FIG. 6.

In alternative embodiments of the present invention, all of the portions of the exemplary method may be carried out by a WFS 200 in combination with a network-connected device (such as a weather display device 30a or smartphone 30b), external system 100 and/or control system 360, or by a weather display device 30a, 30b, external system 100, or control system 360, each of which may include hardware and software of a type discussed below with reference to the WFS 200 in FIG. 6.

Referring again to FIG. 3, the method begins with storing, e.g., in the memory of the WFS 200, a model of time-varying wind flow in the earth's atmosphere, as shown at step 402 of FIG. 3. The model correlates atmospheric pressure forces to wind speeds over time for a geographical region. The large-scale atmospheric pressure forces may be expressed as an equivalent geostrophic wind. Any suitable model may be used for this purpose.

By way of non-limiting example, the model may be a mathematical model relating an imbalance among an atmospheric pressure gradient, Coriolis force (Coriolis frequency) and turbulent stress resulting from turbulent air flow mixing in the earth's atmosphere for a particular geographical region to changes over time in Zonal and Meridional horizontal wind speeds for the geographical region. Accordingly, the model may correlate large-scale atmospheric pressure forces to time-dependent horizontal wind speed, or wind velocity vectors, for a particular geographical region.

By way of further non-limiting example, in one embodiment the mathematical model comprises equations of an unsteady atmospheric (Ekman or otherwise) boundary layer relating changes over time in the Zonal and Meridional wind speeds to the imbalance between the pressure gradient force, the Coriolis force and the friction force (mainly caused by turbulent eddy mixing causing turbulent stresses). In one illustrative and non-limiting example of such a mathematical model, the mathematical model comprises the expression:

$$\frac{d^2A}{dt^2} + \alpha \frac{dA}{dt} + f_c(f_c - i\alpha)A = f_c^2 A_g + if_c \frac{dA_g}{dt},$$

where

A is the time-dependent horizontal wind velocity vector expressed as a complex variable (A=U+i V, where U and V are the Zonal and Meridional horizontal wind speed components, respectively) and $A_g$ is a geostrophic value reflecting large scale atmospheric pressure force; $f_c$ is the Coriolis force parameter; and $\alpha$ is a quantification of turbulent eddy mixing induced by the turbulent eddy viscosity, which is well known in the art and beyond the scope of the present invention. By way of example, $\alpha$ may be determined as follows:

$$\alpha(z, t) = -\frac{1}{U}\frac{\partial}{\partial z}\left(\nu_T \frac{\partial U}{\partial z}\right) = -\frac{1}{V}\frac{\partial}{\partial z}\left(\nu_T \frac{\partial V}{\partial z}\right),$$

where z is the elevation above ground at which the wind velocity vector is sought, U is the Zonal wind speed and V the Meridional wind speed (both functions of elevation z and time t), and $\nu_T$ the turbulent eddy viscosity, which is well known in the art.

By way of example, in the lowest 150 meters or so of the atmosphere $\alpha$ may also be estimated as follows:

$$\alpha(z) = -\frac{1}{\ln(z/z_0)} \frac{\partial}{\partial z}\left(\frac{v_T(z)}{z}\right),$$

where z is the elevation above ground at which the wind velocity vector is sought, $z_0$ is the roughness length of the earth surface underneath, and $v_T$ the turbulent eddy viscosity, which is well known in the art. By way of alternative example, α may also be determined from prior meteorological observations at the geographical region/site of interest.

By way of example, the wind velocity used for wind-energy applications, could be obtained from the anemometers that measure the wind speed and its direction at wind turbines hub height (e.g. around 10-200 m above the ground) in the particular geographical location of interest, or even at lower heights that subsequently can be extrapolated to hub heights.

In this manner, the wind forecasting is based upon a novel approach for describing unsteady wind dynamics (large-scale atmospheric pressure fields) near the earth's surface, which involves highly turbulent air flow dynamics in the lower atmosphere. The exemplary mathematical model described above provides a damped-oscillator model for the wind speed dynamics.

Next, the method involves receiving, e.g., at the WFS 200, data reflecting wind speeds for a specific geographical region, as shown at step 404 in FIG. 3.

Accordingly, the received data may reflect time-dependent horizontal wind velocity vectors. These data are observed and reflect historical wind speed measurement for the specific geographical region of interest; they could include datasets from a single or a network of observational stations or remote sensing devices for the domain of interest. Accordingly, the data is for one or more specific geographical regions during a preceding period of time, the preceding period of time preceding a reference time, which may be the current time or a recent, preferably as recent as possible, reference time. The preceding period of time may be a short-term period of time, or a longer period of time. It may be advantageous to use data from a short-term period of time particularly when it is desired to forecast for a future short-term period of time, because the most relevant data is thereby used for forecasting purposes.

Accordingly, the preceding period of time may be a period of time of not more than 10 hours, not more than 6 hours, not more than 5 hours, not more than 4 hours, not more than 3 hours, not more than 2 hours, not more than 1 hour, or of less than 1 hour. By way of non-limiting example, the receiving, at the wind forecasting system, data may reflect changes over time of Zonal and Meridional horizontal wind speeds for the geographical region.

By way of example, this may involve receipt of data from a weather data source 50 via a communications network 40, as shown in FIG. 1. By way of further example, such data may be received as a computer data file or continuous stream of data in any format from wind-farm operators, nearby weather stations, or other sources. Referring now to FIG. 6, the data received may be stored in the memory 218 of the WFS 200 for further processing as described herein.

Referring again to FIG. 3, the method next involves determining according to the model, e.g., at the wind forecasting system, a trend reflecting changes over time of large-scale atmospheric pressure forces for the geographical region during the preceding period of time, as shown at step 406. Accordingly, with respect to the exemplary mathematical models described above, this may involve performing, e.g. at the wind forecasting system, an inverse application of the model to determine the trend reflecting changes over time of large-scale atmospheric pressure forces as a function of the changes over time in wind speeds (e.g., Zonal and Meridional horizontal wind speeds) for the geographical region during the preceding period. In effect, this involves using the wind speed data (A) as the input to the model, and solving the equation to determine the corresponding large-scale atmospheric pressure forces ($A_g$) for the same preceding period of time, according to the model.

The method further involves extrapolating the trend, e.g., at the wind forecasting system, to determine forecasted large-scale atmospheric pressure forces for the geographical region during a future period of time, as shown at step 408 in FIG. 3. The future period of time is a period of time succeeding the reference time. In a preferred embodiment, because this method provides substantially more accurate wind forecasting for short-term future periods of time, the future period of time may be a period of time of not more than 10 hours, not more than 6 hours, not more than 5 hours, not more than 4 hours, not more than 3 hours, not more than 2 hours, not more than 1 hour, or of less than 1 hour.

The extrapolation of the large-scale atmospheric pressure forces involves determining expected/forecasted large-scale atmospheric pressure forces for a particular geographic region based on observed large-scale atmospheric pressure forces for the particular geographic region during a recent time period preceding the future period for which the forecast is desired. This may involve determining a trend in the recently observed pressure force data, and extrapolating that trend into the future in a manner accounting for the trend. Any suitable method may be used for extrapolating the pressure forces to determine forecasted pressure forces.

The extrapolation of the trend may be performed using various methods. By way of example, the extrapolation of the pressure forces may be performed using a simple linear extrapolation in time. In this example, a linear change for the pressure forces is extrapolated, such that a trend of change of the pressure forces over time is assumed to continue in the future in unchanged fashion.

Accordingly, the method further includes determining according to the model, e.g. at the wind forecasting system, a forecasted wind speeds as a function of the forecasted large-scale atmospheric pressure forces, as shown at step 410. More specifically, this may involve determining a time-dependent horizontal wind velocity vector for the geographical region during the future period of time, as a function of the forecasted large-scale atmospheric pressure forces for the future period of time, according to the model. This determining may be achieved by performing a forward application of the model to determine forecasted wind speeds for the geographical region during the future period of time, as a function of the forecasted large-scale atmospheric pressure forces for the future period of time. In effect, this involves using the forecasted large-scale atmospheric pressure forces ($A_g$), which are extrapolated from a trend in recent data, for the future period of time, and solving the equation to determine forecasted wind speed data (A) for the future period of time, according to the model.

This approach is advantageous in that it provides particularly accurate short-term wind forecasts in part because wind speeds are highly variable over time, while the large-scale atmospheric pressure forces vary more slowly over time. By accounting for a recent trend, the large-scale atmospheric pressure forces can be extrapolated into a future period to provide an accurate large-scale atmospheric pressure force forecast for the future period. Using the model, a corresponding wind speed forecast can be determined for the future period with increased accuracy over other wind forecasting methods, particularly for a forecast for a short-term future time period.

Figure 4A:
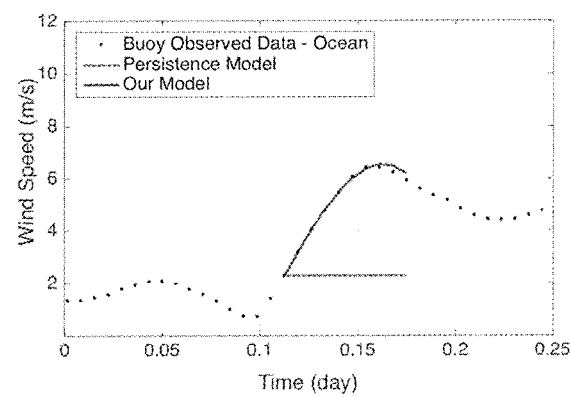
FIGS. 4A and 4B are graphs showing comparisons, for two different time periods, of actual observed wind speeds to wind speed forecasts for a conventional prior art persistence model in comparison to the inventive forecasting method.
Figure 4B:
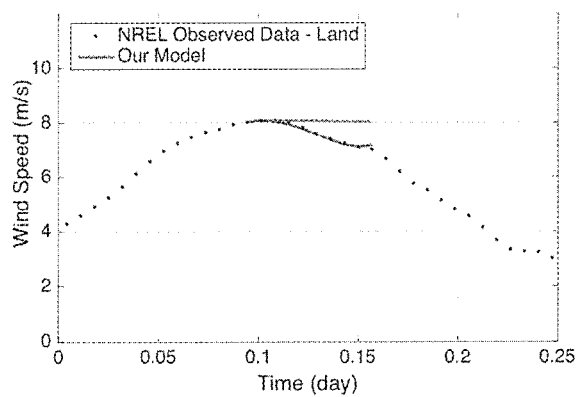

By way of example, a first observational data set is provided from the CHLV2 station of the National Oceanic and Atmospheric Administration's (NOAA) Buoy Center that is located in the offshore of the Virginia Beach. Its anemometer height is 43.3 m above the mean sea level and the data includes wind speed and direction for a whole year (2012), every 10 minutes. A second data set is provided by the NWTC 135-m tower of the National Renewable Energy Laboratory located in Colorado, for April 2014 wind speed and direction data provided every 10 minutes. FIGS. 4A and 4B show comparisons, for two different time periods of actual observed wind speeds to wind speed forecasts for a conventional prior art persistence model in comparison to the inventive forecasting method. FIG. 4A represents the test of the inventive model for the offshore wind data, while FIG. 4B displays the test for the onshore data.

Referring now to FIGS. 4A and 4B, the dotted lines are actual observed wind speed data. The straight lines show predicted wind speeds using a conventional prior art persistence model wind speed forecast. The curved lines show predicted wind speeds using the inventive wind forecasting method disclosed herein. For each forecast, the bases of the forecasts are the "measured" wind speeds before the start of the prediction simulation. As shown in these Figures, for both data sets, the novel forecasting method disclosed herein provides a more accurate wind forecast, particularly over the short-term time periods, as compared to a conventional persistence model-based forecast.

Table 1 (below) shows error statistics based on the absolute model's errors for one exemplary forecasting horizon, comparing actual observed wind speed to forecasted wind speed, for forecasts made using the conventional persistence model to forecasts made according to the present invention. As shown in this Table 1, the present invention provides lower relative forecast error, and a high fraction of periods with improved wind speed forecast as compared to the persistence model, and thus shows a higher accuracy of wind speed forecasts.

TABLE 1

|  | Persistence | Present Invention |
|---|---|---|
| Fraction of Improved Periods compared to the persistence model (%) | — | 88% |
| Average RMSE | 1.05 (m/s) | 0.53 (m/s) |
| 90 percentile Error | 2.0 (m/s) | 0.91 (m/s) |

Figure 5:
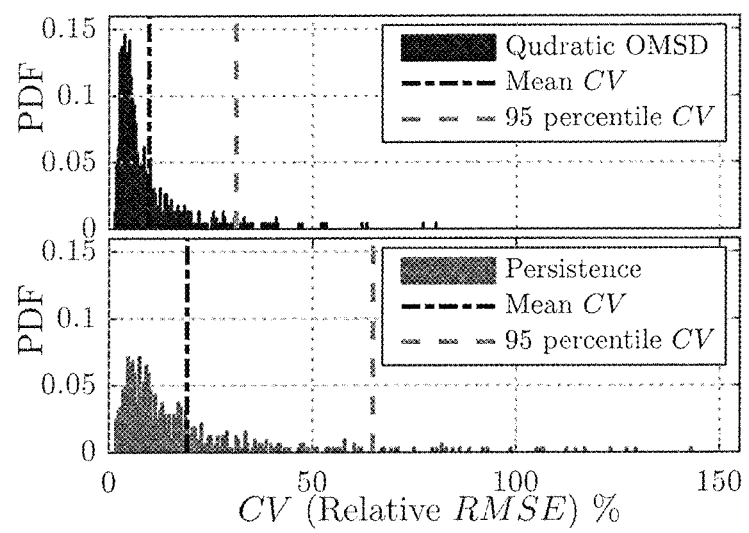
FIG. 5 shows graphs showing a comparison of the accuracy of the wind speed forecasts made using the invention method and the persistence model, as illustrated by the probability density function of the absolute errors.

FIG. 5 shows graphs showing a comparison of the accuracy of the wind speed forecasts made using the invention method and the persistence model, as illustrated by the probability density function of the absolute errors. More specifically, FIG. 5 compares the probability density functions (from many different time periods) of the error from an exemplary embodiment of the present (e.g., a Quadratic Optimized Mass Spring Damper (OMSD) model) consistent with the present invention against persistence model predictions. Dashed lines show the mean, and 95-percentile error. Table 1 and FIG. 5 both illustrate that the inventive method outperforms the persistence model significantly: it reduces the average, relative, and 90th percentile errors of predictions to less than half compared to persistence model errors. Moreover, it outperforms persistence in about 90% the prediction periods.

Referring again to FIG. 3, the exemplary method further includes transmitting a control signal to control operation of a connected system as a function of the forecasted wind speed, i.e., according to the wind forecast, as shown in FIG. 412. For example, a control signal for a specific wind power system as shown in FIG. 320, could include the forecasted generated wind power, which is a function of the forecasted wind velocity (which is correlated to a wind power forecast). This may occur in any suitable fashion, and the connected device may be a discrete and separate computing hardware connected via a communications network, or may be a connected component with a unitary computing hardware appliance or consumer product.

As noted above, wind forecasting in accordance with the present invention has many applications in many different fields. By way of non-limiting example, the novel wind forecasting methodology may be used in connection with wind energy forecasting performed by Transmission System Operators (TSOs) and Independent Power Producers (IPPs). By way of example, the wind forecasting may be used for the purpose of electricity market clearing, economic load dispatch planning, load increment/decrement decisions, regulation actions and more. The novel wind forecasting methodologies can significantly reduce errors in short-term wind forecasting, can allow for more efficient wind power generation, can provide more accurate and less computationally expensive (much faster) forecasts than current forecast models, such as the persistent or other statistical models, and is anchored to a robust physical model of the wind variability that makes it general and location-independent, so that it may be used to perform forecasts in various different geographical regions.

Accordingly, for example, the wind forecasting functions may be incorporated into an electrical power generation system, as described above with reference to FIG. 2. Such a power generation system may include not only a wind forecasting system as described herein, but also a control system operatively connected to the wind forecasting system, the control system receiving the forecasted wind speeds for the geographical region during the future period of time, the control system responsively transmitting a control signal to the secondary power generation equipment to throttle electrical power production from the secondary power generation equipment as a function of the forecasted wind speeds, the forecasted wind speeds corresponding to an expected power production from the primary power generation system.

Referring again to FIG. 1, the exemplary networked computing environment 10 further includes computing devices operated by individual users, members of the general public, consumers, etc., such as weather display device 30a and web-enabled smartphone 30b. Any suitable computing device may be used for this purpose. Further, the exemplary networked computing environment 10 also includes a computing device operated by an organization, such as a corporation or other business entities, weather bureau, state/local/other governmental entity, etc., such as external system 100. As described in further detail herein, the weather display device 30, web-enabled smartphone 30b or external system 100 receives via the communications network wind forecast information prepared by the WFS 200 based at least in part on the weather data received from the weather data source 50. Hardware and software for enabling web-based (and other) communication of data among networked computing devices are well known in the art and beyond the scope of the present invention, and thus are not discussed in detail herein.

In other embodiments, the functionality of the WFS 200 may be integrated into another system, to provide a unitary device, such that communication between the devices 30a, 30b or external system 100 occurs within a unitary device, rather than via a communications network. For example, the essential functionality of the WFS 200 may be incorporated into a weather display device 30a, such as a weather station for home use, such that the weather display device receives data from the weather data source 50 via the network 40, and then performs and displays the wind forecasts discussed herein. This may be accomplished, for example, via hardware and/or software of the weather display device 30a. By way of further example, the essential functionality of the WFS 200 may be incorporated into the external system, such as a control system for an electrical power generation system, such that the external system 100 receives data from the weather data source 50 via the network 40, and then performs and utilizes the wind forecasts discussed herein, e.g., by issuing control signals to regulate operation of the power generation system. Thus, the control signal may be transmitted to control operation of a dependent system as a function of the forecasted wind speed. Thus, the dependent system is controlled at least in part by a forecast determined by the wind forecasting system. In one embodiment the dependent system is a computerized device including a display for displaying a wind speed alert, and thus the control signal causes the display to display the forecasted wind speed. By way of example, this could be performed by a weather station for consumer/home use that is in network communication with the external system 100. Alternatively, the dependent system could be a computerized device for issuing a wind speed alert, and wherein the control signal causes the device to issue the wind speed alert. By way of example, the alert could be issued via a software "app" executing on a conventional smartphone, and in network communication with the external system 100.

Accordingly, the method may involve transmitting a control signal for controlling operation of a dependent system, such as the weather display device 30, web-enabled smartphone 30b or external system 100, as a function of the forecasted wind speed during the future period of time, such that operation of the dependent system is controlled at least in part by a wind forecast determined by the wind forecasting system.

By way of further example, the dependent system may be a power generation system, and the control signal may cause the power generation system to increase or decrease output from electrical power generation equipment as a function of the forecasted wind speed.

By way of further example, the WFS 200 or a discrete electronic device may include the WFS forecasting functionality and a display for displaying forecasted wind speeds. In this case, instructions stored in the memory of the device include instructions for causing the display to display the forecasted wind speeds for the geographical region during the future period of time.

By way of further example, the WFS or a discrete electronic device may further include a transmitter for transmitting a control signal, and instructions may be stored in the memory for causing the transmitter to transmit a control signal indicating the forecasted wind speeds for the geographical region during the future period of time. Alternatively, the device may include instructions for causing the transmitter to transmit a control signal for issuing a wind speed alert from a computerized device receiving the control signal, e.g., via a software app of smartphone device.

It will be appreciated, by way of further example, that the forecasting described herein may be combined with other models or methods to produce systems that may have various applications. Any system that involves use of the present forecasting method is part of this description. By way of example, an exemplary system may comprise autonomous drones whereby the drones use the predicted wind speed to optimize their flight plan and path and/or simultaneously collect and provide wind data to the prediction system to improve its performance. Or they may comprise self-driving vehicles whereby the vehicles use the predicted wind speed optimize their operation and performance and/or simultaneously collect and provide wind data to the prediction system to improve its performance. In addition, the present methods can be applied with data from a single or a network of air quality monitoring stations, together forming a system for predicting and analyzing future air quality evolution for various air pollutants including but not limited to particulate matter, volatile organic compounds (VOCs), NO, NO2, SO2, O3, NH3, and non-biological or biological particles including sand, dust, soil particles, microbes, fungal spores, bacteria spores, viruses, pollen, mite, remain of biological beings living or historical. The method may also be useful for predicting the evolution of natural phenomena including but not limited to rain, snow, storm, and fire. The methods may be combined with models for energy consumption of buildings, together forming a system for predicting and analyzing future energy demand and optimizing the building performance for comfort and cost. The method can be integrated with a model for powerline resilience, together forming a system for predicting and analyzing the probability of failure in powerlines to preemptively perform maintenance operations that reduce failure probability. The method can also be used for the simulation, prediction and analysis of air and space transportation including but not limited to by airplanes, drones, rockets and other air transportation, wind farms, buildings, powerlines, communication towers, highways, and rail roads.

Figure 6:
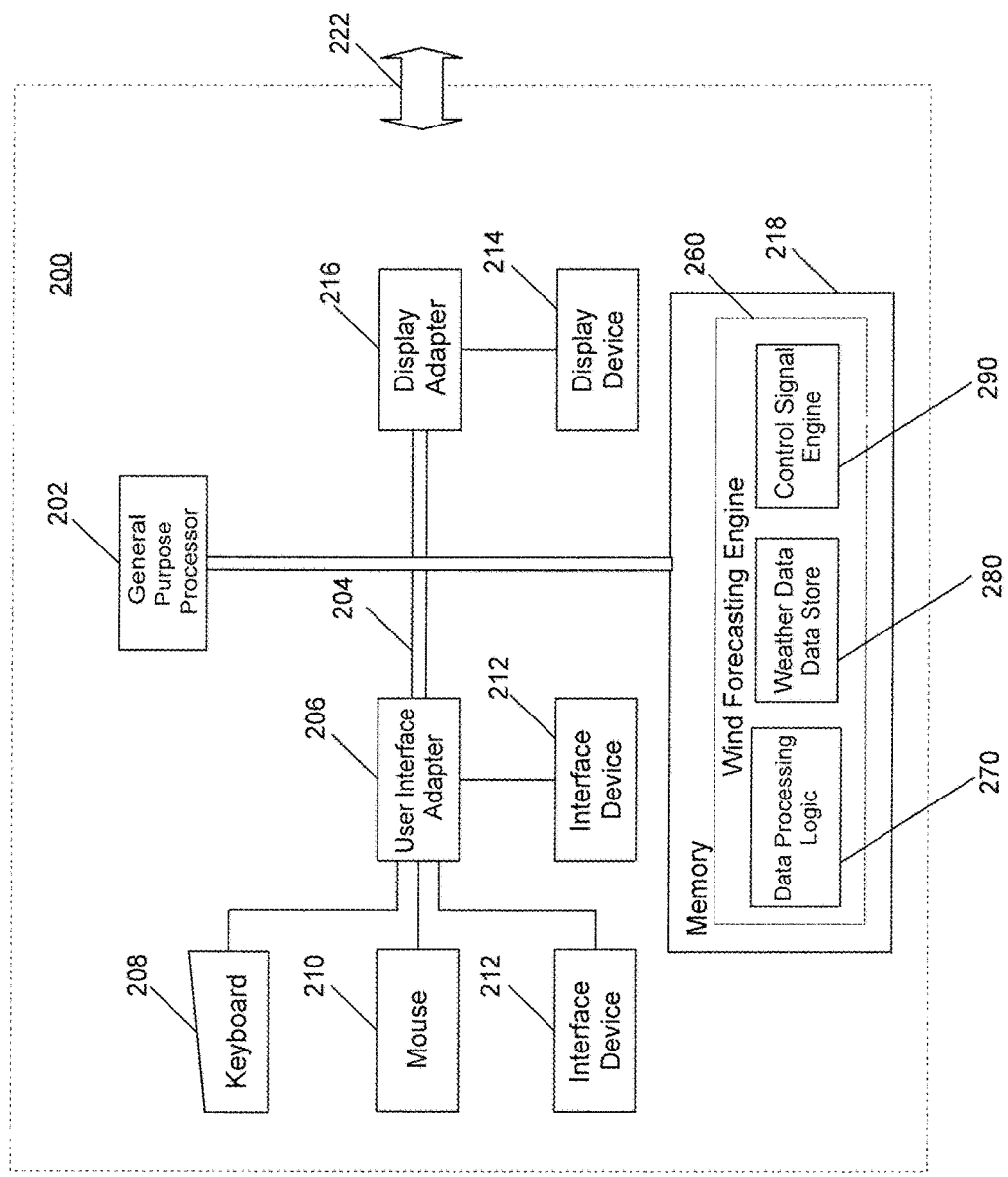
FIG. 6 is a schematic showing an exemplary wind forecasting system in accordance with an exemplary embodiment of the present invention.

FIG. 6 is a schematic diagram showing an exemplary wind forecasting system (WFS) 200 in accordance with an exemplary embodiment of the present invention. The WFS 200 is shown logically in FIGS. 1 and 2 as a single representative server for ease of illustration only. The WFS 200 includes conventional server hardware storing and executing specially-configured computer software for carrying out a method in accordance with the present invention. Accordingly, the exemplary WFS 200 of FIG. 6 includes a general purpose microprocessor (CPU) 202 and a bus 204 employed to connect and enable communication between the microprocessor 202 and the components of the WFS 200 in accordance with known techniques. The exemplary WFS 200 includes a user interface adapter 206, which connects the microprocessor 202 via the bus 204 to one or more interface devices, such as a keyboard 208, mouse 210, and/or other interface devices 212, which can be any user interface device, such as a touch sensitive screen, digitized entry pad, etc. The bus 204 also connects a display device 214, such as an LCD screen or monitor, to the microprocessor 202 via a display adapter 216. The bus 204 also connects the microprocessor 202 to memory 218, which can include a hard drive, diskette drive, tape drive, etc.

The WFS 200 may communicate with other computers or networks of computers, for example via a communications channel, network card or modem 222. The WFS 200 may be associated with such other computers in a local area network (LAN) or a wide area network (WAN), and may operate as a server in a client/server arrangement with another computer, etc. Such configurations, as well as the appropriate communications hardware and software, are known in the art.

The WFS's software is specially configured in accordance with the present invention. Accordingly, as shown in FIG. 6, the WFS 200 includes computer-readable, processor-executable instructions stored in the memory for carrying out the methods described herein. Further, the memory stores certain data, e.g. in databases or other data stores. For example, FIG. 6 shows schematically storage in the memory 218 of wind forecasting engine software 260 including a physical, mathematical or other model and data processing logic 270 for determining wind forecasts in accordance with the present invention, a weather data data store 280 for storing weather data received by the WFS and used by the forecasting engine, and a control signal engine 290 comprising instructions for transmitting a control signal indicating the forecasted wind speeds, instructions for transmitting a control signal for controlling operation of a dependent system as a function of the forecasted wind speeds, instructions for causing the transmitter to transmit a control signal for issuing a wind speed alert, and/or instructions for causing the display to display the forecasted wind speeds for the geographical region during the future period of time. Optionally, other instructions and/or data may be stored in the memory as discussed herein, such as instructions to issue a control signal for controlling wind turbines' rotational speed, blade angle, or other operational aspects as a function of forecasted wind or direction obtained from the present invention. The memory may further store data for displaying and/or communicating wind forecasts, control signals, and the like, as discussed herein.

Additionally, computer readable media storing computer readable code for carrying out the method steps identified above is provided. The computer readable media stores code for carrying out subprocesses for carrying out the methods described above.

A computer program product recorded on a computer readable medium for carrying out the method steps identified above is provided. The computer program product comprises computer readable means for carrying out the methods described above.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A computer-implemented method for performing wind forecasting using a computer-implemented wind forecasting system comprising a microprocessor, a memory operatively coupled to the microprocessor, and microprocessor-executable instructions for causing the wind forecasting system to perform the wind forecasting method, the method comprising:

storing, at the wind forecasting system, a model correlating large-scale atmospheric pressure forces to time-dependent horizontal wind speed and direction for a particular geographical region;

receiving, at the wind forecasting system, data reflecting a time-dependent horizontal wind velocity vector for the geographical region during a preceding period of time, the preceding period of time preceding a reference time;

determining, at the wind forecasting system, a trend reflecting changes over time of large-scale atmospheric pressure forces for the geographical region during the preceding period of time as a function of the time-dependent wind velocity vector, according to the model;

extrapolating, at the wind forecasting system, the trend in large-scale atmospheric pressure forces for the preceding period of time to determine forecasted large-scale atmospheric pressure forces for a future period of time, the future period of time being a period of time succeeding the reference time;

determining, at the wind forecasting system, a forecasted time-dependent horizontal wind velocity vector for the geographical region during the future period of time, as a function of the forecasted large-scale atmospheric pressure forces for the future period of time, according to the model; and transmitting, from the wind forecasting system, a signal for use in determining a navigation plan for an autonomous vehicle;

whereby operation of the autonomous vehicle is controlled at least in part by a short-term wind forecast determined by the wind forecasting system, and wherein the signal is used to determine the navigation plan for the autonomous vehicle as a function of the forecasted time-dependent horizontal wind velocity vector for the geographical region during the future period of time.

2. The method of claim 1, wherein the autonomous vehicle is a flying drone vehicle, and wherein the navigation plan comprising an optimized flight plan.

3. The method of claim 2, wherein the flying drone vehicle is configured to collect wind data during operation and to transmit the wind data to the wind forecasting system to improve performance of the wind forecasting system.

4. The method of claim 1, wherein the autonomous vehicle is a land vehicle, and wherein the navigation plan is optimized for one of operation and performance.

5. The method of claim 4, wherein the land vehicle is configured to collect wind data during operation and to transmit the wind data to the wind forecasting system to improve performance of the wind forecasting system.

6. The method of claim 1, wherein the method further comprises:

receiving at the wind forecasting system, from at least one air quality monitoring station, air quality data;

analyzing the air quality data; and predicting future air quality changes in relation to at least one of particulate matter, volatile organic compounds (VOCs), NO, NO2, SO2, O3, NH3, and non-biological or biological particles including sand, dust, soil particles, microbes, fungal spores, bacteria spores, viruses, pollen, mites, and remains of biological beings living and historical, as a function of the analyzed air quality data.

7. The method of claim 1, wherein the method further comprises:

receiving at the wind forecasting system, from at least one air quality monitoring station, air quality data;

analyzing the air quality data; and predicting future natural phenomena in relation to at least one of rain, snow, storms, and fire, as a function of the analyzed air quality data.

8. The method of claim 1, wherein the method further comprises:
storing, at the wind forecasting system, a model of building energy consumption; and
predicting future building energy demand as a function of the model of building energy consumption and the forecasted time-dependent horizontal wind velocity vector for the geographical region.

9. The method of claim 1, wherein the method further comprises:
storing, at the wind forecasting system, a model of powerline resilience; and
predicting future powerline failure as a function of the model of powerline resilience and the forecasted time-dependent horizontal wind velocity vector for the geographical region.

10. The method of claim 1, wherein the method further comprises:
performing at least one of simulation, prediction and analysis of at least one of air and space transportation as a function of the forecasted time-dependent horizontal wind velocity vector for the geographical region.

11. The method of claim 1, wherein the method further comprises:
performing at least one of simulation, prediction and analysis of at least one of a wind farm, a building, a powerline, a communication tower, a highway, and a railroad as a function of the forecasted time-dependent horizontal wind velocity vector for the geographical region.

12. A computer-implemented method for performing wind forecasting using a computer-implemented wind forecasting system comprising a microprocessor, a memory operatively coupled to the microprocessor, and microprocessor-executable instructions for causing the wind forecasting system to perform the wind forecasting method, the method comprising:
storing, at the wind forecasting system, a mathematical model expressing an imbalance among an atmospheric pressure gradient, Coriolis force and turbulent frictional stresses resulting from turbulent air flow mixing in earth's atmosphere for a particular geographical region to changes over time in Zonal and Meridional horizontal wind speeds for the geographical region;
receiving, at the wind forecasting system, data reflecting changes over time of Zonal and Meridional horizontal wind speeds for the geographical region during a preceding period of time, the preceding period of time preceding a reference time;
performing, at the wind forecasting system, an inverse application of the model to determine, at the wind forecasting system, a trend reflecting changes over time of large-scale atmospheric pressure forces for the geographical region during the preceding period of time as a function of the changes over time in Zonal and Meridional horizontal wind speeds for the geographical region, according to the model, the trend including forecasted large-scale atmospheric pressure forces for a future period of time, the future period of time being a short-term period of time succeeding the reference time;
performing, at the wind forecasting system, a forward application of the model to determine, at the wind forecasting system, forecasted Zonal and Meridional horizontal wind speeds for the geographical region during the future period of time, as a function of the forecasted large-scale atmospheric pressure forces for the future period of time, according to the model; and
transmitting, from the wind forecasting system, a signal for use in determining a navigation plan for an autonomous vehicle;
whereby operation of the autonomous vehicle is controlled at least in part by a short-term wind forecast determined by the wind forecasting system, and wherein the signal is used to determine the navigation plan for the autonomous vehicle as a function of the forecasted time-dependent horizontal wind velocity vector for the geographical region during the future period of time.

13. The method of claim 12, wherein the autonomous vehicle is a flying drone vehicle, and wherein the navigation plan comprising an optimized flight plan.

14. The method of claim 13, wherein the flying drone vehicle is configured to collect wind data during operation and to transmit the wind data to the wind forecasting system to improve performance of the wind forecasting system.

15. The method of claim 12, wherein the autonomous vehicle is a land vehicle, and wherein the navigation plan is optimized for one of operation and performance.

16. The method of claim 15, wherein the land vehicle is configured to collect wind data during operation and to transmit the wind data to the wind forecasting system to improve performance of the wind forecasting system.

17. The method of claim 12, wherein the method further comprises:
receiving at the wind forecasting system, from at least one air quality monitoring station, air quality data;
analyzing the air quality data; and
predicting future air quality changes in relation to at least one of particulate matter, volatile organic compounds (VOCs), NO, NO2, SO2, O3, NH3, and non-biological or biological particles including sand, dust, soil particles, microbes, fungal spores, bacteria spores, viruses, pollen, mites, and remains of biological beings living and historical, as a function of the analyzed air quality data.

18. The method of claim 12, wherein the method further comprises:
receiving at the wind forecasting system, from at least one air quality monitoring station, air quality data;
analyzing the air quality data; and
predicting future natural phenomena in relation to at least one of rain, snow, storms, and fire, as a function of the analyzed air quality data.

19. The method of claim 12, wherein the method further comprises:
storing, at the wind forecasting system, a model of building energy consumption; and
predicting future building energy demand as a function of the model of building energy consumption and the forecasted time-dependent horizontal wind velocity vector for the geographical region.

20. The method of claim 12, wherein the method further comprises:
storing, at the wind forecasting system, a model of powerline resilience; and
predicting future powerline failure as a function of the model of powerline resilience and the forecasted time-dependent horizontal wind velocity vector for the geographical region.

21. The method of claim 12, wherein the method further comprises:
performing at least one of simulation, prediction and analysis of at least one of air and space transportation as a function of the forecasted time-dependent horizontal wind velocity vector for the geographical region.

22. The method of claim 12, wherein the method further comprises:
performing at least one of simulation, prediction and analysis of at least one of a wind farm, a building, a powerline, a communication tower, a highway, and a railroad as a function of the forecasted time-dependent horizontal wind velocity vector for the geographical region.

23. A wind forecasting system for providing a wind forecast, the system comprising:
a processor;
a memory operably connected to the processor for storing instructions; and
instructions stored in the memory for causing the system to:
store, in the memory, a physical model of time-varying wind flow in earth's atmosphere, the model correlating atmospheric pressure forces to wind velocities over time;
receive data reflecting changes over time of wind speeds for a particular geographical region during a preceding period of time, the preceding period of time preceding a reference time;
perform an inverse application of the model to determine a trend reflecting changes over time of large-scale atmospheric pressure forces for the geographical region during the preceding period of time as a function of the changes over time in wind velocities for the geographical region;
extrapolate, at the wind forecasting system, the trend to determine forecasted large-scale atmospheric pressure forces for the geographical region during a future period of time, the future period of time being a period of time succeeding the reference time;
perform a forward application of the model to determine, at the wind forecasting system, forecasted wind speeds and directions for the geographical region during the future period of time, as a function of the forecasted large-scale atmospheric pressure forces for the future period of time; and
transmit, from the wind forecasting system, a signal for use in one of determining a navigation plan for an autonomous vehicle, controlling operation of a vehicle, controlling operation of a power generation system, controlling operation of a power transmission system, and controlling operation of an energy consumption system external to the wind forecasting system;
whereby operation of one of the autonomous vehicle, the vehicle, the power operation system, the power transmission system, and the energy consumption system is controlled at least in part by a short-term wind forecast determined by the wind forecasting system as a function of the forecasted time-dependent horizontal wind velocity vector for the geographical region during the future period of time.

* * * * *